US008532939B2

(12) United States Patent
Bhattacharya et al.

(10) Patent No.: US 8,532,939 B2
(45) Date of Patent: Sep. 10, 2013

(54) SYSTEM AND METHOD FOR MONITORING HEALTH OF AIRFOILS

(75) Inventors: Aninda Bhattacharya, Bangalore (IN); Vinay Bhaskar Jammu, Bangalore (IN); Vivek Venugopal Badami, Schenectady, NY (US); Venkatesh Rajagopalan, Bangalore (IN); Rahul Srinivas Prabhu, Bangalore (IN); Ajay Kumar Behera, Bangalore (IN); Nidhi Naithani, Bangalore (IN); Mahalakshmi Shunumugam Balasubramaniam, Bangalore (IN)

(73) Assignee: General Electric Company, Niskayuna, NY (US)

( * ) Notice: Subject to any disclaimer, the term of this patent is extended or adjusted under 35 U.S.C. 154(b) by 62 days.

(21) Appl. No.: 12/872,830

(22) Filed: Aug. 31, 2010

(65) Prior Publication Data

US 2011/0010108 A1 Jan. 13, 2011

Related U.S. Application Data

(63) Continuation-in-part of application No. 12/825,895, filed on Jun. 29, 2010, and a continuation-in-part of application No. 12/825,763, filed on Jun. 29, 2010, and a continuation-in-part of application No. 12/340,777, filed on Dec. 22, 2008, now Pat. No. 7,941,281, and a continuation-in-part of application No. 12/262,783, filed on Oct. 31, 2008, now abandoned.

(51) Int. Cl.

| | |
|---|---|
| ***G01B 3/44*** | (2006.01) |
| ***G01B 3/52*** | (2006.01) |
| ***G06F 19/00*** | (2011.01) |

(52) U.S. Cl.
USPC ................. 702/35; 73/577; 73/660; 700/287; 702/34; 702/182

(58) Field of Classification Search
USPC ................. 702/34, 33, 35, 41, 43, 75, 79, 81, 702/89, 113, 115, 145, 151, 178, 182, 183, 702/185, 187; 73/660, 865.8, 577; 700/108, 700/110, 174, 175; 324/644
See application file for complete search history.

(56) References Cited

U.S. PATENT DOCUMENTS

| | | | | |
|---|---|---|---|---|
| 4,887,468 | A * | 12/1989 | McKendree et al. | 73/660 |
| 4,955,269 | A * | 9/1990 | Kendig et al. | 73/577 |
| 5,838,588 | A * | 11/1998 | Santoso et al. | 700/287 |
| 6,157,310 | A | 12/2000 | Milne et al. | |

(Continued)

FOREIGN PATENT DOCUMENTS

| | | | |
|---|---|---|---|
| EP | 1754861 | A2 | 2/2007 |
| GB | 2344177 | A | 5/2000 |

OTHER PUBLICATIONS

EPO Search Report; Application No. 11177241-1267/2423451 dated Jun. 15, 2012; 6 Pages.

*Primary Examiner* — John H Le
(74) *Attorney, Agent, or Firm* — Scott J. Asmus

(57) ABSTRACT

A system is presented. The system includes a data acquisition system that generates time of arrival (TOA) data corresponding to a plurality of blades in a device, a central processing subsystem that determines features of each of the plurality of blades utilizing the TOA data, and evaluates the health of each of the plurality of blades based upon the determined features.

19 Claims, 6 Drawing Sheets

(56) References Cited

U.S. PATENT DOCUMENTS

| | | | |
|---|---|---|---|
| 6,999,903 | B2 | 2/2006 | Ikeda et al. |
| 2007/0132461 | A1 | 6/2007 | Holmquist et al. |
| 2007/0271023 | A1 | 11/2007 | Morris et al. |
| 2008/0206057 | A1 | 8/2008 | Twerdochlib |
| 2009/0301055 | A1 | 12/2009 | Kallappa |
| 2010/0114502 | A1 | 5/2010 | Badami et al. |

* cited by examiner

SYSTEM AND METHOD FOR MONITORING HEALTH OF AIRFOILS

CROSS REFERENCE TO RELATED APPLICATIONS

This application is a continuation-in-part of U.S. patent application Ser. No. 12/262,783, entitled "System And Method For Article Monitoring", filed on Oct. 31, 2008 now abandoned, which is herein incorporated by reference. This application is also a continuation-in-part of U.S. patent application Ser. No. 12/340,777 now having U.S. Pat. No. 7,941,281, entitled "System And Method For Rotor Blade Health Monitoring", filed on Dec. 22, 2008, which is herein incorporated by reference. This application further claims priority as a continuation-in-part of U.S. patent application Ser. No. 12/825,763, entitled "System And Method For Monitoring Health Of Airfoils", filed on Jun. 29, 2010, which is herein incorporated by reference. This application further claims priority as a continuation-in-part of U.S. patent application Ser. No. 12/825,895, entitled "System And Method For Monitoring Health Of Airfoils", filed on Jun. 29, 2010, which is herein incorporated by reference.

BACKGROUND

Embodiments of the disclosure relates generally to systems and methods for monitoring health of rotor blades or airfoils.

Rotor blades or airfoils play a crucial role in many devices with several examples including axial compressors, turbines, engines, a turbomachine, or the like. For example, an axial compressor has a series of stages with each stage comprising a row of rotor blades or airfoils followed by a row of static blades or static airfoils. Accordingly, each stage comprises a pair of rotor blades or airfoils and static airfoils. Typically, the rotor blades or airfoils increase the kinetic energy of a fluid that enters the axial compressor through an inlet. Some part of the kinetic energy is converted into pressure energy due to decrease in relative velocity, and the rest of the kinetic energy is converted into pressure due to decrease in absolute velocity of the fluid. Accordingly, the rotor blades or airfoils and static airfoils play a crucial role to increase the pressure of the fluid.

Furthermore, the rotor blades or airfoils and the static airfoils are vital due to wide and varied applications of the axial compressors that include the airfoils. Axial compressors, for example, may be used in a number of devices, such as, land based gas turbines, jet engines, high speed ship engines, small scale power stations, or the like. In addition, the axial compressors may be used in varied applications, such as, large volume air separation plants, blast furnace air, fluid catalytic cracking air, propane dehydrogenation, or the like.

The airfoils operate for long hours under extreme and varied operating conditions such as, high speed, fluid load, and temperature that affect the health of the airfoils. In addition to the extreme and varied conditions, certain other factors lead to fatigue and stress on the airfoils. The factors, for example, may include centrifugal forces, fluid forces, thermal loads during transient events, load due to non-synchronous vibration such as rotating stall, and the cyclic load due to synchronous resonant vibration. Prolonged effects of the factors lead to defects and crack in the airfoils. One or more of the cracks may widen with time to result in a liberation of an airfoil or a portion of the airfoil. The liberation of airfoil may be hazardous for the device that includes the airfoils, and thus may lead to enormous monetary losses. In addition, it may be unsafe and horrendous for people near the device.

Accordingly, it is highly desirable to develop a system and method that may predict health of airfoils in real time. More particularly, it is desirable to develop a system and method that may predict cracks or fractures in real time.

BRIEF DESCRIPTION

Briefly in accordance with one aspect of the embodiments, a system is presented. The system includes a data acquisition system that generates time of arrival (TOA) data corresponding to a plurality of blades in a device, a central processing subsystem that determines features of each of the plurality of blades utilizing the TOA data, and evaluates the health of each of the plurality of blades based upon the determined features.

In accordance with an aspect of the embodiments, a system is presented. The system includes a plurality of devices, wherein each of the plurality of devices comprises a plurality of blades, a plurality of data acquisition systems that generate time of arrival (TOA) data corresponding to the plurality of blades in each of the plurality of devices. The system further includes a central processing subsystem that determines features of each of the plurality of blades utilizing the TOA data, evaluates the health of each of the plurality of blades based upon the determined features to generate health evaluation results, and a web server for displaying the features and the health evaluation results of the plurality of blades.

In accordance with an aspect of the present technique, a method is presented. The method includes a method for monitoring the health of a plurality of blades in a device. The method includes the steps of generating time of arrival (TOA) data corresponding to each of the plurality of blades in a device, determining features of each of the plurality of blades utilizing the TOA data, and evaluating the health of each of the plurality of blades based upon the determined features.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
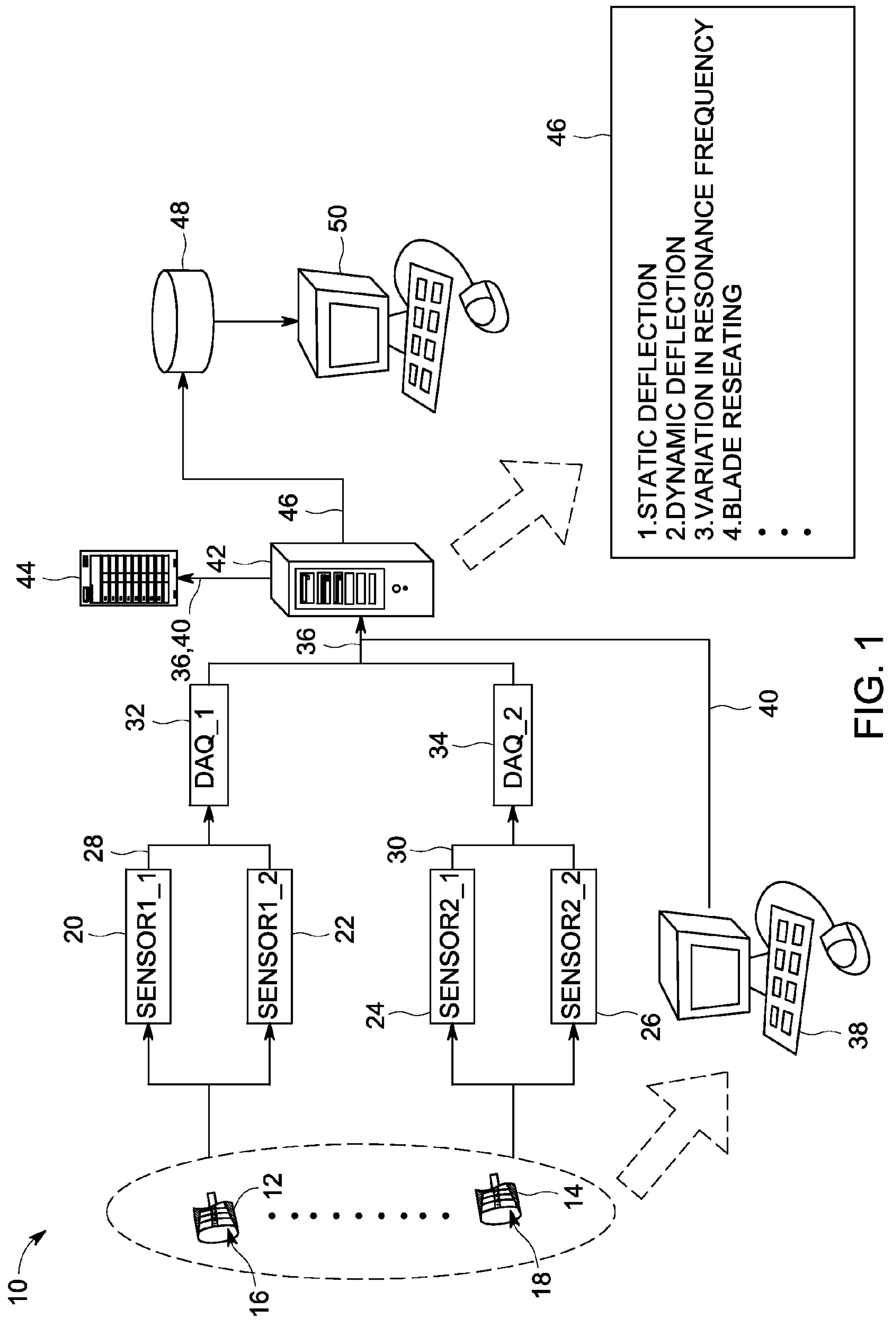
FIG. 1 is an exemplary diagrammatic illustration of a blade health monitoring system, in accordance with an embodiment of the present system.

As discussed in detail below, embodiments of the present system and techniques monitor one or more devices to evaluate the health of one or more blades in each of the devices.

Embodiments of the present system provide a central processing subsystem that monitors the devices in real-time, wherein the devices may be located at different remote locations. By way of an example, the devices may include a turbomachine, a gas turbine, a compressor, a jet engine, a high speed ship engine, a small scale power station, or the like. More particularly, the present system and techniques determine one or more features of the blades to evaluate the health of the blades. As used herein, the term "features" may be used to refer to characteristics of one or more blades that may be used to determine the health of the blades. The features, for example, may include static deflection, dynamic deflection, blade clearance, variations in resonance frequency, reseating of a blade, or the like. Hereinafter, the terms "blades" and "airfoils" will be used interchangeably. As used herein, the term "static deflection" is used to refer to a fixed change in an original or expected position of a blade from the expected or original position of the blade. Also, the term, "dynamic deflection" is used herein to refer to an amplitude of vibration of a blade over the mean or original position of the blade. Furthermore, as used herein, the term "resonance frequencies" may be used to refer to the frequencies of oscillations of a blade that match its natural frequencies of vibration. In addition, the term "reseating of a blade" is used herein to refer to a locking of a blade at a position different from the original or expected position of the blade in joints, such as, a dovetail joint.

In operation, a time of arrival (TOA) of a blade at a reference position may vary from an expected TOA due to one or more defects or cracks in the blades. Accordingly, the variation in the TOA of the blades may be used to determine one or more of the features. As used herein, the term "expected TOA" may be used to refer to a TOA of a blade at a reference position when there are no defects or cracks in the blade and the blade is working in an ideal situation, load conditions are optimal, and the vibrations in the blade are minimal. Hereinafter, for ease of understanding, the word "TOA" and the term "actual TOA" will be used interchangeably.

However, in addition to the defects or cracks in the blades, the TOA may also vary due to one or more operational data and reseating of blades. The operational data, for example, may include an inlet guide vane (IGV) angle, a load variation, asynchronous vibrations, synchronous vibrations, variation of speed, speed, mass flow, discharge pressure, or the like. Consequently, due to the effects of the operational data and the reseating of blades, the features that are determined based upon the variation in the actual TOA of the blades may not be accurate. Accordingly, it is crucial to negate the effects of the operational data and the reseating of the blades on the actual TOA for the determination of the accurate static deflection, hereinafter "static deflection." Certain embodiments of the present techniques negate the effects of the operational data and the reseating of the blades from the actual TOA of the blades to determine the features. Certain other embodiments of the present techniques normalize or compensate the effects of the operational data on the actual TOA.

FIG. 1 is a diagrammatic illustration of an exemplary rotor blade health monitoring system 10. The system 10 monitors one or more devices 12, 14 to evaluate the health of one or more blades 16, 18 in the devices 12, 14. The devices 12, 14, for example, may be a turbomachine, a gas turbine, an axial compressor, or the like. It may be noted that the devices 12, 14 may be located at different remote locations. As shown in the presently contemplated configuration, the device 12 includes the one or more blades 16 and the device 14 includes the one or more blades 18.

Furthermore, as shown in FIG. 1, the system 10 includes one or more sensors 20, 22, 24, 26 that sense the arrivals of the blades 16, 18 at respective reference points to generate respective blade passing signals (BPS) 28, 30. In the presently contemplated configuration, the sensors 20, 22 sense the arrivals of the blades 16 at a respective reference point to generate the BPS signals 28. Similarly, the sensors 24, 26 sense the arrivals of the blades 18 at a respective reference point to generate the BPS signals 30. The reference point, for example, may be underneath or adjacent to the sensors 20, 22, 24, 26.

In one embodiment, the sensors 20, 22, 24, 26 may sense an arrival of the leading edge of each of the blades 16, 18 to generate the BPS signals 28, 30. In another embodiment, the sensors 20, 22, 24, 26 may sense an arrival of the trailing edge of each of the blades 16, 18 to generate the BPS signals 28, 30. In still another embodiment, the sensor 20 may sense an arrival of the leading edge and the sensor 22 may sense an arrival of the trailing edge of each of the blades 16, or vice versa. Similarly, the sensor 24 may sense an arrival of the leading edge and the sensor 26 may sense an arrival of the trailing edge of each of the blades 18, or vice versa. The sensors 20, 22, 24, 26, for example, may be mounted adjacent to the respective blades 16, 18 on a stationary object in a position such that the arrivals of each of the blades 16, 18 may be sensed efficiently. In one embodiment, at least one of the sensors 20, 22, 24, 26 is mounted on a casing (not shown) of the one or more blades 16, 18. By way of a non-limiting example, the sensors 20, 22, 24, 26 may be magnetic sensors, capacitive sensors, eddy current sensors, or the like.

Subsequent to the generation of the BPS signals 28, 30 by the sensors 20, 22, 24, 26, the BPS signals 28, 30 may be transmitted to respective data acquisition systems 32, 34. More particularly, the sensors 20, 22 transmit the BPS signals 28 to the DAQ_1 32 and the sensors 24, 26 transmit the BPS signals 30 to the DAQ_2 34. As shown in FIG. 1, the sensors 20, 22 are communicatively coupled to the data acquisition system (DAQ_1) 32, and the sensors 24, 26 are communicatively coupled to the data acquisition system (DAQ_2) 34. The DAQ_1 32 and DAQ_2 34 determine times of arrival (TOAs) of respective blades 16, 18 utilizing the respective BPS signals 28, 30. More particularly, the DAQ_1 32 determines TOA of the blades 16 utilizing the BPS signals 28, and the DAQ_2 determines TOA of the blades 18 utilizing the BPS signals 30. Hereinafter, the terms "TOA" and "actual TOA" will be used interchangeably. It may be noted that while in the presently contemplated configurations, none of the sensors 20, 22, 24, 26 is shown as a component of the data acquisition systems 32, 34, however, each of the sensors 20, 22, 24, 26 may be a component of the respective DAQs 32, 34. It may be noted that the DAQ_1 32 and the DAQ_2 34 may be located at different remote locations from one another.

Furthermore, the DAQ_1 32 and the DAQ_2 34 generate TOA data 36 utilizing the actual TOA of the blades 16, 18. The TOA data 36, for example, may include clearance data, identity of the sensors 20, 22, 24, 26, identity of the blades 16, 18, identity of the devices 12, 14, the actual TOA of the blades 16, 18, the category of the sensor indicating whether the sensor is a leading edge or a trailing edge sensor, or the like. By way of a non-limiting example, an exemplary TOA data generated by data acquisition subsystems of a system A may be represented as shown in the following Table 1:

| Serial No. | Identity of a device | Identity of a blade | Identity of a sensor | Type of sensor | Actual TOA of the blade |
|---|---|---|---|---|---|
| 1. | dev_1 | blade1_dev_1 | sen1_dev_1 | Leading edge sensor | 2200 mils |
| 2. | dev_1 | blade1_dev_1 | sen2_dev_1 | Trailing edge edge sensor | 2500 mils |
| 3. | dev_1 | blade2_dev_1 | sen2_dev_1 | Trailing edge sensor | 9200 mils |
| 4. | dev_2 | blade1_dev_2 | sen1_dev_2 | Leading edge sensor | 2000 mils |
| 5. | dev_2 | blade2_ dev_2 | sen2_dev_2 | Leading edge sensor | 9100 mils |
| 6. | dev_2 | blade3_dev_2 | sen2_dev_2 | Leading edge sensor | 16300 mils |

As shown in Table 1, the system A includes devices, such as, dev_1 and dev_2. Furthermore, the dev_1 includes blades, such as, blade1_dev_1 and blade2_dev_1. Similarly, the dev_2 includes blades, such as, blade 1_dev_2, blade2_dev_2 and blade3_dev_2. In addition, the arrivals of the blades in the dev_1 are sensed by sensors, such as, sen1_dev_1 and sen2_dev_1. Similarly, the arrivals of the blades in the dev_2 are sensed by sensors, such as, sen1_dev_2 and sen2_dev_2. Furthermore, the last column of Table 1 includes actual TOA of the blades in the devices dev_1 and dev_2.

In addition, the system 10 includes one or more onsite monitoring machines (OSM), such as, an onsite monitoring machine 38 (OSM) for collecting one or more operational data 40 of the devices 12, 14 and the blades 16, 18 in the devices 12, 14. The operational data 40, for example, may include an inlet guide vane (IGV) angle, a load, speed, mass flow, discharge pressure, or the like. The OSM 38, for example, may be a combination of hardware and software that collects the operational data 40.

As shown in the presently contemplated configuration, a central processing subsystem 42 is communicatively coupled to the DAQs 32, 34 and the OSM 38. Subsequent to the generation of the TOA data 36 and the collection of the operational data 40, the TOA data 36 and the operational data 40 may be transmitted to the central processing subsystem 42. More particularly, the DAQs 32, 34 transmit the TOA data 36, and the OSM 38 forwards the operational data 40 to the central processing subsystem 42. In certain embodiments, the central processing subsystem 42 may store the TOA data 36 and the operational data 40 as a backup file 44.

Moreover, the central processing subsystem 42 determines one or more features 46 of the blades 16, 18 utilizing the TOA data 36 and the operational data 40. As previously noted, the features 46, for example, may include static deflection, blade clearance, dynamic deflection, variations in resonance frequency, reseating of a blade, or the like. More particularly, the central processing subsystem 42 determines the features 46 of the blades 16, 18 after taking into account the effects of the operational data 40 on the actual TOA in the TOA data 36. In certain embodiments, the central processing subsystem 42 determines the features 46 of the blades 16, 18 after deducting the effects of reseating of the blades 16, 18 from the actual TOA of the blades 16, 18. For example, with reference to Table 1, features corresponding to the blade1_dev_1 in the dev_1 may be determined utilizing the respective actual TOA that is shown as 2200 mils and other operational data that may be received from the OSM 38. In addition, the central processing subsystem 42 evaluates the health of the blades 16, 18 utilizing the features 46. Consequent to the determination of evaluation of the health of the blades, one or more health evaluation results may be generated by the central processing subsystem 42. The health evaluation results may include plots, charts, graphs, visuals, or the like. In certain embodiments, the health evaluation results may include declarations, such as, probability of a propagation of a crack in a blade, probability of a twist in a blade, or the like. The determination of the features 46 and evaluation of the health of the blades 16, 18 will be explained in greater detail with reference to FIGS. 2-6.

In certain embodiments, the central processing subsystem 42 may store the features 46 and the health evaluation results in a data repository 48. Furthermore, as shown in FIG. 1, the system 10 may include a web server 50 that may be coupled to the data repository 48. The web server 50 may be configured to display the features 46 and the health evaluation results stored in the data repository 48. The web server 50, for example, may display the features 46 as tables, charts, and other visuals.

Figure 2:
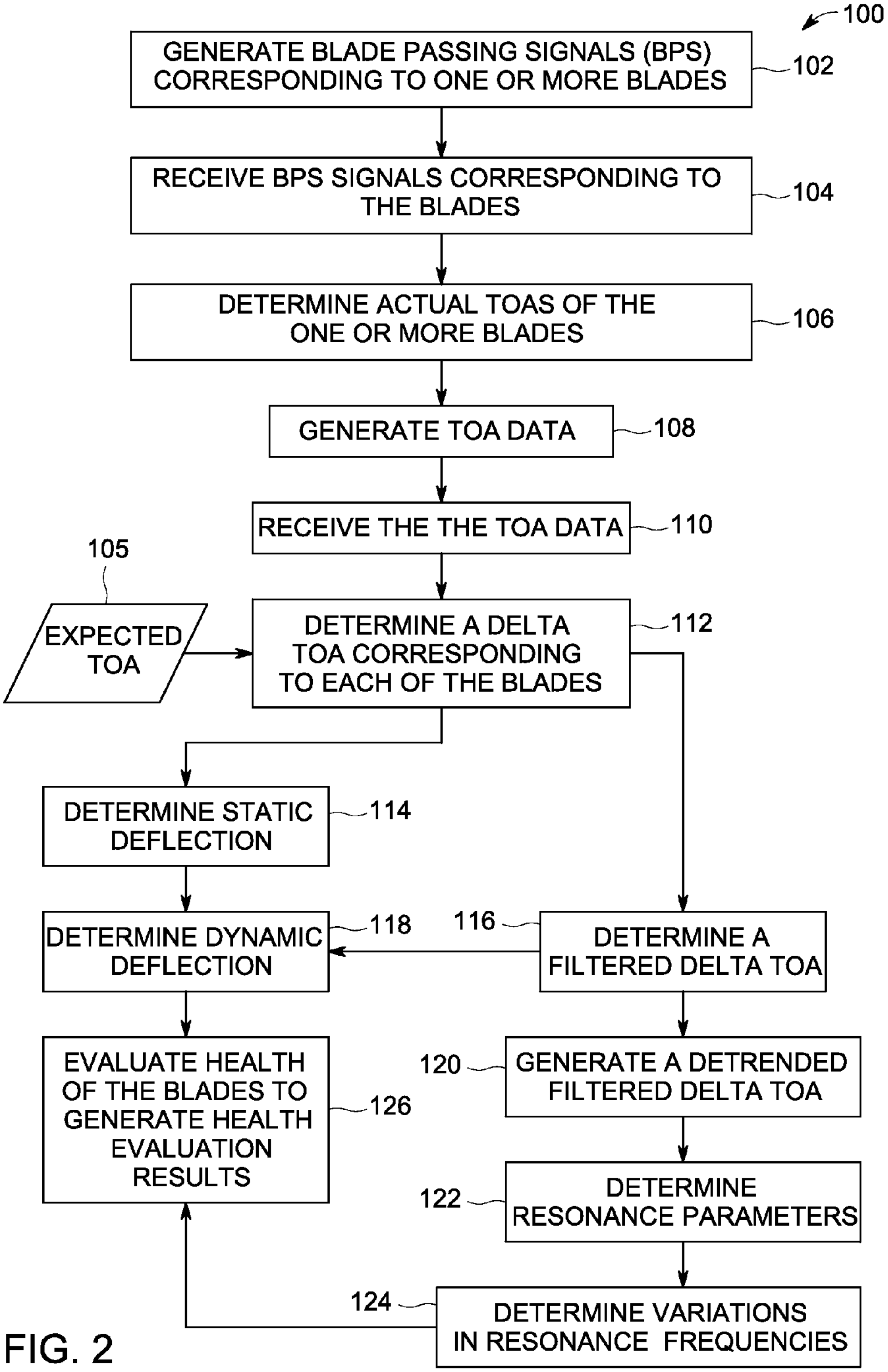
FIG. 2 is an exemplary flowchart for monitoring one or more devices to evaluate the health of one or more blades in each of the devices, in accordance with an embodiment of the present techniques.

Referring now to FIG. 2, an exemplary flowchart 100 for monitoring one or more devices to evaluate the health of one or more blades in each of the devices, is depicted. The method starts at step 102 where BPS signals corresponding to the blades may be generated. The BPS signals, for example, may be generated by sensors, such as, the sensors 20, 22, 24, 26 (see FIG. 1). As previously noted with reference to FIG. 1, the BPS signals may be generated by the sensors by sensing the arrivals of the blades at respective reference points.

Subsequently, at step 104 the BPS signals may be received by respective data acquisition systems (DAQs). The DAQs, for example, may be the DAQ_1 32 and the DAQ_2 34 (see FIG. 1). Furthermore, at step 106 actual TOAs of the blades are determined utilizing the BPS signals. The actual times of arrival (TOAs), for example, may be determined by the DAQs. Subsequently, at step 108, TOA data may be generated by the DAQs. For example, the TOA data may be the TOA data 36 (see FIG. 1). As previously noted, the TOA data may include clearance data, identity of the devices that include the blades, identity of one or more sensors that sense the TOA of the blades, the category of the sensor indicating whether the sensor is a leading edge or a trailing edge sensor, identity of the blades, the actual TOA of the blades, or the like.

Furthermore, at step 110, a central processing subsystem receives the TOA data from the DAQs. In certain embodiments, subsequent to the receipt of the TOA data from the DAQs, the central processing subsystem may store the TOA data as a back up file. As shown in FIG. 2, at step 112, a delta TOA corresponding to each of the blades may be determined. The delta TOA corresponding to each of the blades may be determined by the central processing subsystem. The delta TOA corresponding to a blade, for example, may be a difference of an actual TOA corresponding to the blade that is determined at step 106 and an expected TOA 105 corresponding to the blade. It may be noted that the delta TOA corresponding to the blade is representative of a variation from the expected TOA 105 of the blade at a time instant. The delta TOA, for example, may be determined using the following equation (1):

$$\Delta TOA_k(t)=TOA_{act(k)}(t)-TOA_{exp(k)} \tag{1}$$

where $\Delta TOA_k$ (t) is a delta TOA corresponding to a blade k at a time instant t or a variation from the expected TOA corresponding to the blade k at the time instant t, $TOA_{act(k)}$ is an actual TOA corresponding to the blade k at the time instant t, and $TOA_{exp(k)}$ is an expected TOA corresponding to the blade k.

As used herein, the term "expected TOA" may be used to refer to an actual TOA of a blade at a reference position when there are no defects or cracks in the blade and the blade is working in an operational state in which the effects on the actual TOA of the operational conditions reflected by the operational data are minimal. In one embodiment, an expected TOA corresponding to a blade may be determined by equating an actual TOA corresponding to the blade to the expected TOA of the blade when a device that includes the blade has been recently commissioned, bought, or otherwise verified as healthy. Such a determination assumes that since the device has been recently commissioned or bought, all the blades are working in an ideal situation, the load conditions are optimal, and the vibrations in the blade are minimal. In another embodiment, the expected TOA may be determined by taking an average of actual times of arrival (TOAs) of all the blades in the device.

Furthermore, at step 114, a static deflection corresponding to each of the blades is determined utilizing the delta TOA of the blades. The static deflection corresponding to each of the blades, for example, may be determined by the central processing subsystem. In one embodiment, the static deflection corresponding to each of the blades is determined after deducting the effects of one or more operational data on the delta TOA of each of the blades. In another embodiment, the static deflection of the blades is determined after deducting the effects of the reseating of the blades during a start up of the devices. Exemplary methods for determining the static deflection of the blades will be explained in greater detail with reference to FIGS. 3-5.

In addition, at step 116, a filtered delta TOA corresponding to each of the blades may be determined. The filtered delta TOA corresponding to each of the blades, for example, may be determined by filtering each of the delta TOA utilizing one or more filtering techniques. The one or more filtering techniques, for example, may include a Savitzky-Golay technique, an average filtering technique, a median filtering technique, or other filtering techniques.

At step 118, a dynamic deflection corresponding to each of the blades may be determined. In one embodiment, a dynamic deflection corresponding to a blade may be determined by subtracting a static deflection corresponding to the blade from a delta TOA corresponding to the blade. In another embodiment, a dynamic deflection corresponding to a blade may be determined by subtracting a static deflection corresponding to the blade from the filtered delta TOA corresponding to the blade that has been determined at step 116. Subsequently, at step 120, a detrended filtered delta TOA corresponding to each of the blades may be determined. For example, the deterended filtered delta TOA corresponding to each of the blades may be determined by detrending the filtered delta TOA that have been determined at step 116.

Subsequent to the determination of the detrended filtered delta TOA, one or more resonance parameters may be determined at step 122. The one or more resonance parameters, for example, may be determined by application of one or more techniques on each of the deterended filtered delta TOA that have been determined at step 120. The one or more techniques, for example, may include a single degree of freedom (SDOF) technique, a multiple degree of freedom (MDOF) technique, or the like. By way of a non-limiting example, the resonance parameters may include amplitude, frequency, damping ratio, phase, or the like. Furthermore, at step 124, one or more variations in resonance frequencies of the blades in comparison to baseline resonance frequencies may be determined. As used herein, the term "baseline resonance frequency" is used to refer to the resonance frequency of one or more blades when a device that includes blades is operating in an ideal situation and the blades do not have cracks or defects. The baseline resonance frequencies corresponding to a blade A in a device A, for example, may be determined by determining a statistical distribution of resonance frequencies of the blade A during start up of device A when the device is operating in ideal conditions.

Moreover, at step 126, the health of the blades may be evaluated based upon the features of the blades that have been determined at step 114, 116 and 124. More particularly, the health of blades is evaluated based upon the static deflection that has been determined at step 114, the dynamic deflection that has been determined at step 116, and the variations in the resonance frequencies that have been determined at step 124. Consequent to the evaluation of the health of the blades, one or more health evaluation results may be generated. The health evaluation results, for example, may include graphs, charts, plots, visuals, or the like. In certain embodiments, the health evaluation results may include declarations, such as, probability of propagation of a crack in a blade, probability of a twist in a blade, status of the health of a device, or the like. As previously noted, the static deflection has been determined by deducting the effects of reseating of the blades, thus, the health of the blades is determined based upon the static deflection that does not include the affects due to the reseating of the blades. By way of a non-limiting example, the health evaluation results may show a propagation of a crack in a blade when static deflections of the blade show a monotonic change and resonance frequencies of the blade show a monotonic decrease. By way of another example, a propagation of a crack towards the leading edge of a blade may be declared when static deflections corresponding to the blade (that have been determined based upon delta TOA of a leading edge) show a monotonic change and dynamic deflections of the blade show an increase.

Figure 3:
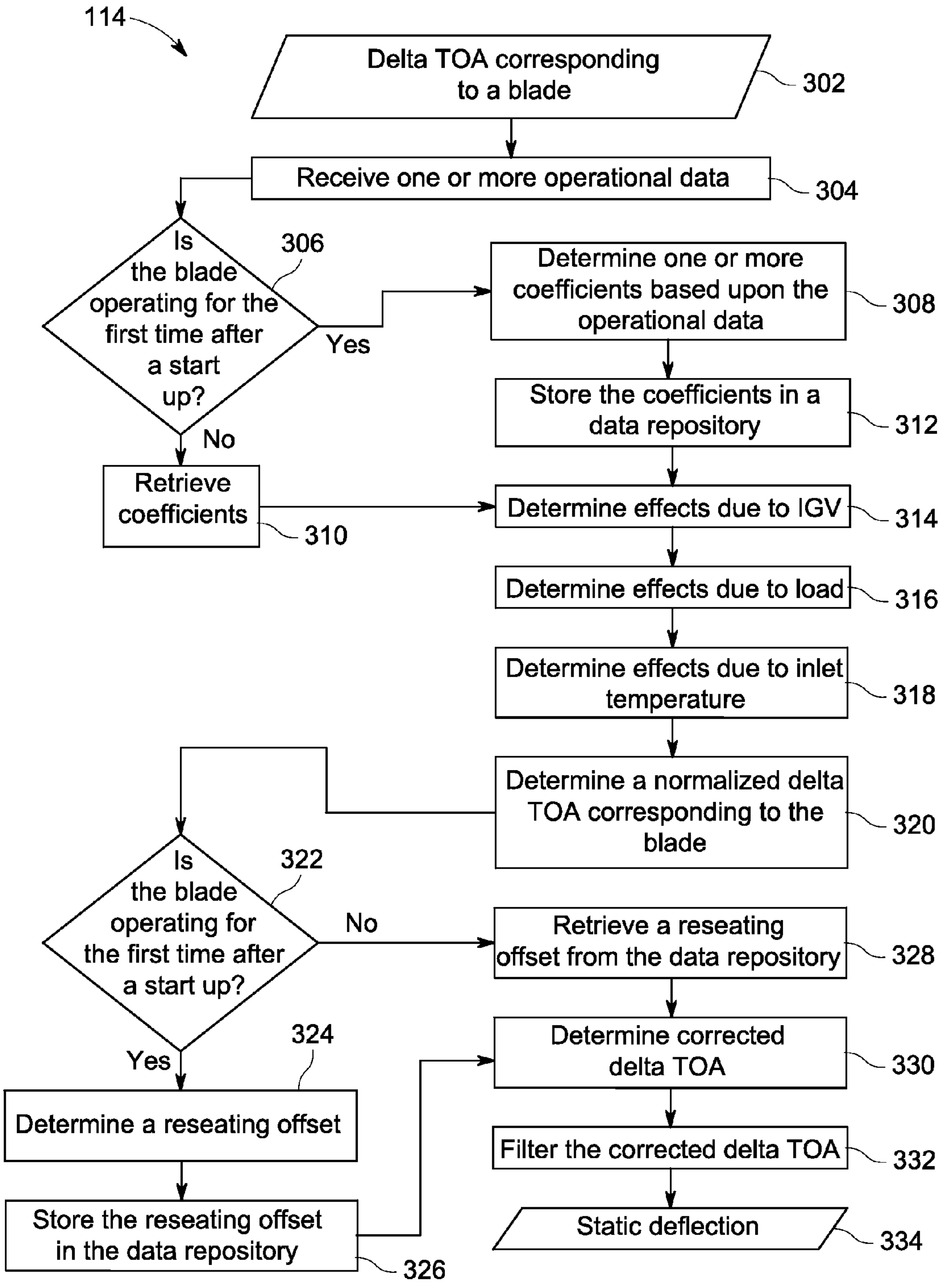
FIG. 3 is a flowchart representing an exemplary method for determining static deflection of a blade, in accordance with an embodiment of the present techniques.

As previously noted, respective actual TOA of one or more blades may be used to determine static deflection of each of the blades. However, the operational state and reseating of the blades may affect the actual TOA of the blades. Consequently, the static deflection that is determined based upon the actual TOA of the blades may not be accurate. Accordingly, it is essential to remove or deduct the effects of the one or more operational data associated with the operational state and reseating of the blades on the actual TOA for the determination of the accurate static deflection. An exemplary method for determining the static deflection by deducting the effects of the one or more operational data and reseating of the blades from the actual TOA or delta TOA that is determined based upon the actual TOA will be explained with reference to FIG. 3. Referring now to FIG. 3, a flowchart representing an exemplary method 114 for determining static deflection of a blade, in accordance with an embodiment of the invention, is depicted. More particularly, step 114 of FIG. 2 is described in greater detail in accordance with an exemplary aspect of the present techniques.

As shown in FIG. 3, reference numeral 302 is representative of a delta TOA corresponding to the blade. In one embodiment, the delta TOA 302 may be determined utilizing the techniques described with reference to step 112 of FIG. 2. Furthermore, at step 304, one or more operational data corresponding to the blade or a device that includes the blade may be received. As previously noted, the operational data, for example, may include an (IGV) angle, load, temperature, speed, mass flow, discharge pressure, or the like. The operational data, for example, may be received by the central processing subsystem 42 from the OSM 38 (see FIG. 1).

Furthermore, at step 306, a check may be carried out to verify if the blade is operating for the first time after a start up of the device that includes the blade. At step 306, if it is the determined that the blade is operating for the first time after the start up, then the control may be transferred to step 308. At step 308, one or more coefficients are determined based upon one or more portions of the operational data. The coefficients, for example, may be determined by utilizing the following equation (2):

$$\Delta TOA_k = \overline{A}\overline{D} \quad (2)$$

where $\Delta TOA_k$ is a delta TOA of a blade k, $\overline{D}$ is one or more portions of operational data and $\overline{A}$ is a coefficient. In one embodiment, the coefficients may be determined by forming a linear combination of the one or more portions of operational data. Furthermore, the values of the one or more portions of operational data may be substituted to determine the coefficients. Moreover, at step 312, the coefficients that have been determined at step 308 are stored in a data repository, such as, the data repository 48 (see FIG. 1). It may be noted that when the coefficients are stored in the data repository any other existing coefficients in the data repository may be erased.

With returning reference to step 306 if it is determined that the blade is not operating for the first time after a start up, then the control may be transferred to step 310. At step 310, the coefficients are retrieved from the data repository. The coefficients are retrieved at step 310 with an assumption that the coefficients have already been determined during a start up of the device that includes the blade and thus, already exist in the data repository. Subsequently at step 314, effects due to IGV angle on the delta TOA 302 may be determined. In one embodiment, the effects due to IGV may be determined using the following exemplary equation (3):

$$T_{IGV}(t) = f(IGV(t)) \quad (3)$$

where $T_{IGV}(t)$ is effects of IGV on a delta TOA at a t instant of time, IGV(t) is IGV angle at the t instant of time and $f$ is a function of the IGV(t). In one embodiment, the function of IGV may be determined by determining a multiple of IGV(t) and a coefficient corresponding to the IGV(t).

At step 316, effects on the delta TOA 302 due to load may be determined. The effects on the delta TOA 302 due to the load may be determined utilizing the following equation (4):

$$T_{load}(t) = g(DWATT(t)) \quad (4)$$

where $T_{load}(t)$ is effects of load on a delta TOA at a t instant of time, DWATT is load at the t instant of time, and g is a function of the load. In one embodiment, the function of DWATT may be determined by determining a multiple of DWATT(t) and a coefficient corresponding to the DWATT. In another embodiment, the function of DWATT may be determined by determining a linear combination of the multiple of DWATT(t) and the coefficient and, another coefficient corresponding to the DWATT.

Subsequently, at step 318, effects due to inlet temperature (CTIM) on the delta TOA 302 may be determined. The effects due to the inlet temperature (CTIM) may be determined utilizing the following equation (5):

$$T_{CTIM}(t) = d(CTIM(t)) \quad (5)$$

where $T_{CTIM}$ is a value of the effects on a delta TOA due to an inlet temperature at a t instant of time, CTIM(t) is the inlet temperature at the t instant of time, d is a coefficient corresponding to the inlet temperature. Subsequent to the determination of the effects on the delta TOA 302 due to IGV at step 314, load at step 316 and CTIM at step 318, a normalized delta TOA is determined at step 320. The normalized delta TOA, for example, may be determined by subtracting the effects of the operational data, such as, the IGV, the load and the inlet temperature (CTIM) from the delta TOA 302.

In one embodiment, the normalized delta TOA, for example, may be determined using the following exemplary equation (6):

$$Norm\_\Delta TOA_k(t) = \Delta TOA_k(t) - T_{load}(t) - T_{CTIM}(t) - T_{IGV}(t) \quad (6)$$

where $Norm\_\Delta TOA_k(t)$ is a normalized delta TOA corresponding to a blade k at a t instant of time, $\Delta TOA_k(t)$ is a delta TOA corresponding to the blade k at the t instant of time and $T_{load}(t)$, $T_{CTIM}(t)$, $T_{IGV}(t)$ are the effects of the load, inlet temperature and IGV on the delta TOA at the t instant of time, respectively.

Typically, one or more blades are fastened to a rotor via one or more joints, such as, dovetail joints. During start up of the device that includes the blades, the blades may shift from their original positions in the joints and may lock in the joints at positions that are different from the original positions of the blades. The locking of the blades in the joints at the positions different from the original positions of the blades is referred to as reseating of the blades. The change in the positions of the blades may vary actual TOA of the blades. Accordingly, delta TOA and normalized delta TOA that are determined based upon the actual TOA of the blades may not be accurate. More particularly, the delta TOA and the normalized delta TOA may not be accurate due to the reseating of the blades. Accordingly, it is essential to correct the actual TOA, delta TOA or the normalized delta TOA corresponding to the blades to remove effects due to the reseating of the blades. The steps 322-330 correct the normalized delta TOA determined at step 320 and the delta TOA 302 of the blade to remove effects due to a reseating of the blade.

At step 322, a check may be carried out to verify whether the blade is operating for the first time after a start up. At step 322, if it is determined that the blade is operating for the first time after a start up, then the control may be transferred to step 324. At step 324, a reseating offset corresponding to the blade may be determined. As used herein, the term "reseating offset" may be used to refer to a numerical value that may be used to remove effects due to reseating of a blade from delta TOA, actual TOA or a normalized delta TOA of the blade. The determination of the reseating offset will be explained in greater detail with reference to FIG. 6. Subsequently, the reseating offset determined at step 324 may be stored in the data repository at step 326. The reseating offset, for example, may be stored in the data repository 48 (see FIG. 1). It may be noted that in the presently contemplated configuration, the reseating offset is determined when the blade is operating for the first time after the start up as it is assumed that the blade may lock at a position different from the original position of the blade during the start up of the device that includes the blade.

With returning reference to step 322, if it is determined that the blade is not operating for the first time after a start up of the device that includes the blade, then the control may be transferred to step 328. It may be noted that when the blade is not operating for the first time after a start up, it indicates that the reseating offset corresponding to the blade has already been determined after a start up of the device that includes the blade and has already been stored in the data repository. Accordingly, at step 328, a reseating offset corresponding to the blade may be retrieved from the data repository.

Subsequent to the storage of the reseating offset at step 326 or the retrieval of the reseating offset at step 328, a corrected delta TOA may be determined at step 330. In one embodiment, the corrected delta TOA may be determined by correcting the normalized delta TOA that has been determined at step 320 for the reseating of the blade. The corrected delta TOA, for example, may be determined by subtracting the reseating offset from the normalized delta TOA corresponding to the blade. In another embodiment, the corrected delta TOA may be determined by correcting the delta TOA 302. In this embodiment, the corrected delta TOA may be determined by subtracting the reseating offset from the delta TOA 302 corresponding to the blade. Moreover, at step 332, the corrected delta TOA may be filtered to generate static deflection 334. The filtering of the corrected delta TOA may reduce noise from the corrected delta TOA. The corrected delta TOA, for example, may be filtered using median filtering, moving average filtering, or combinations thereof.

As previously noted, one or more operational data affect actual TOA of a plurality of blades. However, the operational data may not affect the actual TOA of the blades uniformly. Accordingly, the actual TOA of one or more of the blades may be affected more in comparison to the actual TOA of other blades in the plurality of blades. Consequently, static deflection corresponding to the one or more of the blades may falsely show defects or cracks in the blades due to the additional effects of the operational data in comparison to static deflection corresponding to the other blades. In addition, the static deflection that is determined based upon the actual TOA of the blades may not be accurate static deflection. Accordingly, it is essential to normalize the effects of the operational data on the actual TOA of the plurality of blades in a device. Exemplary methods for determining static deflection by normalizing effects of one or more operational data on actual TOA or delta TOA that is determined based upon the actual TOA will be explained with reference to FIGS. 4 and 5.

Figure 4:
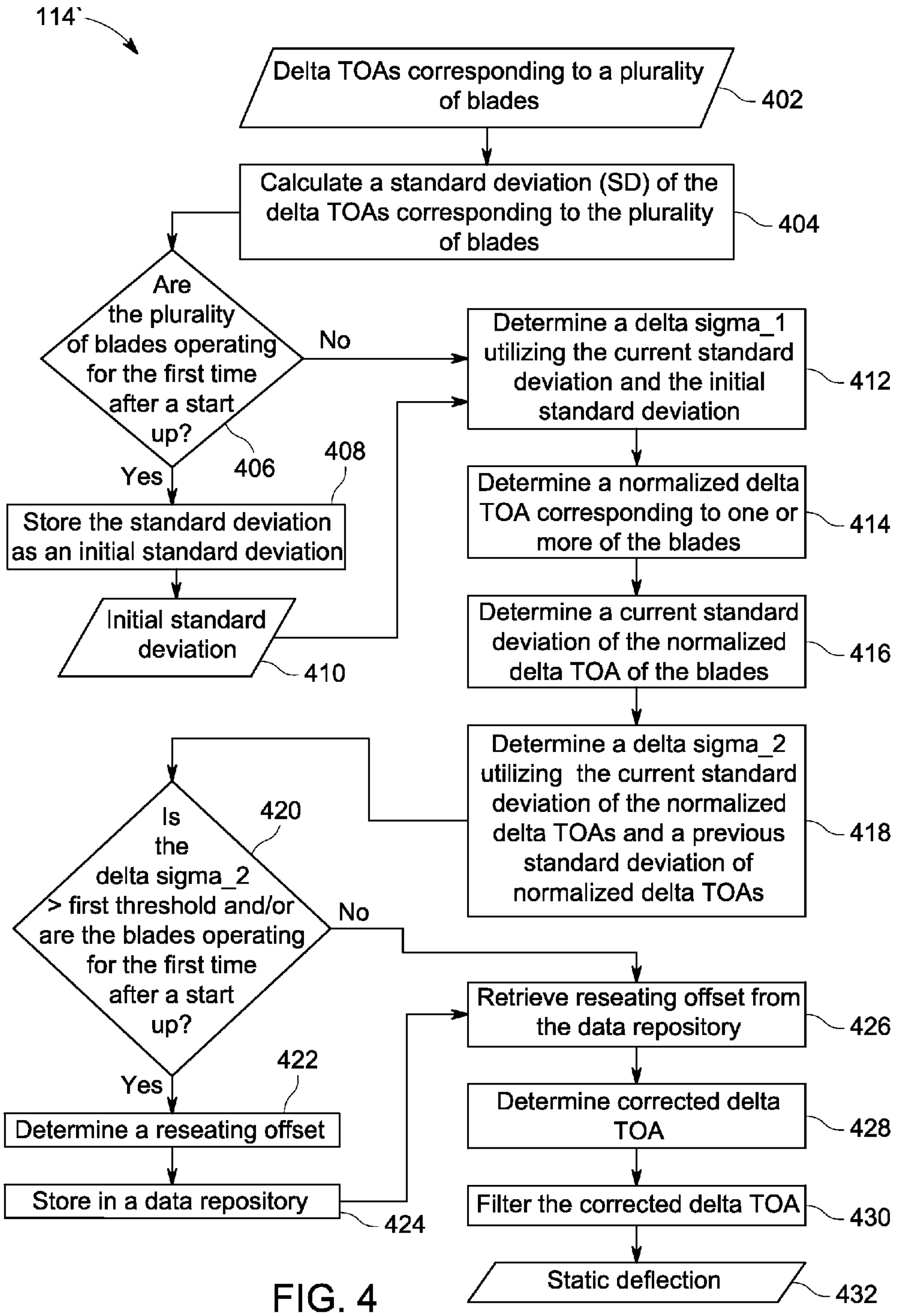
FIG. 4 is a flowchart representing an exemplary method for determining static deflection of a blade, in accordance with another embodiment of the present techniques.

Referring now to FIG. 4, a flowchart representing steps in an exemplary method 114' for determining static deflection in accordance with another embodiment, is depicted. More particularly, FIG. 4 explains step 114' of FIG. 2 in accordance with an embodiment of the present technique for determining the static deflection. As shown in FIG. 4, reference numeral 402 is representative of delta times of arrival (TOAs) corresponding to a plurality of blades in a device, such as, a turbine, axial compressor, or the like. A delta TOA corresponding to each of the plurality of blades may be determined utilizing the techniques explained with reference to step 106 of FIG. 2. In one embodiment, the delta TOAs 402 may be similar to the delta TOA determined at step 106 of FIG. 2.

Furthermore, at step 404, a standard deviation of the delta TOAs corresponding to the plurality of blades may be calculated. For example, when the plurality of blades includes five blades and each of the five blades has a delta TOA as delta $TOA_1$, delta $TOA_2$, delta $TOA_3$, delta $TOA_4$, delta $TOA_5$ then, a standard deviation of the delta $TOA_1$, delta $TOA_2$, delta $TOA_3$, delta $TOA_4$ and delta $TOA_5$ may be calculated at the step 404. Subsequently at step 406, a check may be carried out to determine if the blades are operating for the first time after a start up of a device that includes the plurality of blades. At step 406, if it is determined that the blades are operating for the first time after a start up, then the control may be transferred to step 408.

For ease of understanding, the term "standard deviation" will be hereinafter referred to as "current standard deviation." As shown in FIG. 4, at step 408 the standard deviation that is calculated at step 404 may be stored as an initial standard deviation 410. The initial standard deviation 410 may be stored in a data repository, such as, the data repository 48. As used herein, the term "initial standard deviation" may be referred to as a current standard deviation that is determined when the blades start operating for the first time after a start up. More particularly, the standard deviation that is determined at step 404 may be stored as the initial standard deviation 410 in the data repository.

Referring back to step 406 if it is determined that the blades are not operating for the first time after the start up, then the control may be transferred to step 412. At step 412, a delta sigma_1 may be determined utilizing the current standard deviation that has been determined at step 404 and the initial standard deviation 410. More particularly, the delta sigma_1 may be determined by determining a difference between the current standard deviation that is determined at step 404 and the initial standard deviation 410. It may be noted that when the step 412 is processed for the first time after a start up of the device that includes the plurality of blades, then the values of the initial standard deviation 410 and the current standard deviation determined at step 404 are equivalent. Accordingly, the value of delta sigma_1 may be equal to zero at step 412.

Furthermore, at step 414, a normalized delta TOA corresponding to one or more of the plurality of blades may be determined. The normalized delta TOA, for example, may be determined utilizing the following equation (7):

$$\text{Norm\_}\Delta TOA_k(t)=\Delta TOA_k(t)-K^*(\Delta\sigma(t)\_1)-\text{Mean}(\Delta TOA_{1\,toj}(t)) \tag{7}$$

where Norm_$\Delta TOA_k(t)$ is a normalized delta TOA corresponding to a blade k at a t instant of time, $\Delta TOA_k(t)$ is a delta TOA corresponding to the blade k at the t instant of time and $\Delta\sigma(t)$_1 is a delta sigma_1 at the t instant of time and K is a constant. In one embodiment, the value of the constant K may be determined based upon a mean of delta TOA corresponding to the blades. In one embodiment, the value of K may be 1. In another embodiment, the value of K may be −1. In still another embodiment, the value of K may be 0.

Moreover, at step 416, a current standard deviation of the normalized delta TOA corresponding to the one or more of the plurality of blades may be determined. Subsequently at step 418, a delta sigma_2 may be determined. The delta sigma_2, for example, may be determined by determining a difference between the current standard deviation of the normalized delta TOA and a previous standard deviation of normalized delta TOA. The term "previous standard deviation of normalized delta TOA" may be used to refer to a current standard deviation of normalized delta TOA that is determined at a time step T−1 in comparison to a current standard deviation of normalized delta TOA that is determined at a time step T.

Subsequent to the determination of the delta sigma_2, at step 420 a check may be carried out to verify if the delta sigma_2 is greater than a predetermined first threshold and/or if the plurality of blades are operating for the first time after a start up. The predetermined first threshold may be determined empirically based upon historical delta TOA corresponding to the blades. At step 420 if it is determined that the delta sigma_2 is greater than the predetermined first threshold or the plurality of blades are operating for the first time after a start up, then the control may be transferred to step 422. At step 422, a reseating offset corresponding to the one or more of the plurality of blades may be determined. The determination of the reseating offset will be explained in greater detail with reference to FIG. 6. Subsequent to the determination of the reseating offset, at step 424 the reseating offset may be stored in the data repository, such as, the data repository 48 (see FIG. 1).

With returning reference to step 420, when it is determined that the delta sigma_2 is not greater than the predetermined first threshold and the plurality of blades are not operating for the first time after a start up then, the control may be transferred to step 426. At step 426, the reseating offset may be retrieved from the data repository. It may be noted that no reseating offset is generated when the delta sigma_2 is not greater than the predetermined first threshold and the blades are not operating for the first time after a start up. Accordingly, an existing reseating offset from the data repository is retrieved at step 426. Subsequent to the retrieval of the reseating offset, a corrected delta TOA corresponding to the one or more of the plurality of blades may be determined at step 428. The corrected delta TOA, for example, may be determined utilizing the techniques explained with reference to step 330 of FIG. 3. As previously noted with reference to FIG. 3, the corrected delta TOA may be determined utilizing the techniques explained with reference to step 330 of FIG. 3. For example, the corrected delta TOA corresponding to a blade may be determined utilizing the normalized delta TOA corresponding to the blade that is determined at step 414 and a reseating offset corresponding to the blade that is retrieved from the data repository at step 426. In one embodiment, a corrected delta TOA corresponding to a blade may be determined by subtracting a reseating offset corresponding to the blade from delta TOA corresponding to the blade. The delta TOA, for example, may be one of the delta TOA 402 corresponding to the plurality of blades.

Furthermore, at step 430, the corrected delta TOA may be filtered to generate static deflection 432 corresponding to the one or more of the plurality of blades. As previously noted with reference to FIG. 3, the filtering of the corrected delta TOA may reduce noise from the corrected delta TOA. The corrected delta TOA, for example, may be filtered using a median filtering technique, a moving average filtering technique, or combinations thereof.

Figure 5:
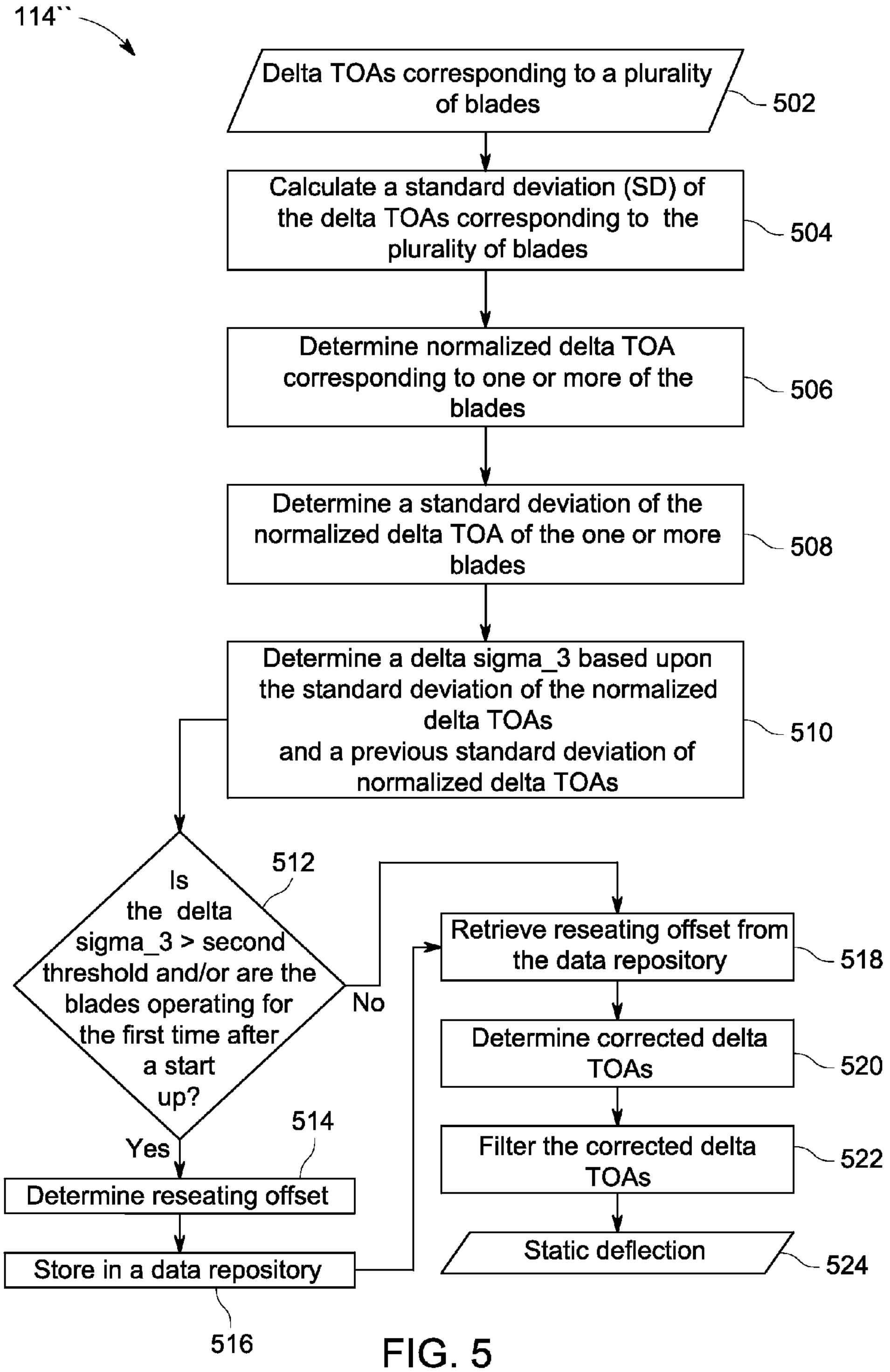
FIG. 5 is a flowchart representing an exemplary method for determining static deflection of a blade, in accordance with still another embodiment of the present techniques.

Referring now to FIG. 5, a flowchart representing steps in an exemplary method 114" for determining static deflection in accordance with another embodiment, is depicted. More particularly, FIG. 5 explains step 114 of FIG. 2 in accordance with an embodiment of the present techniques for determining the static deflection. As shown in FIG. 5, reference numeral 502 is representative of delta times of arrival (TOAs) corresponding to a plurality of blades in a device, such as, a turbine, axial compressor, or the like. A delta TOA corresponding to each of the plurality of blades may be determined utilizing the techniques explained with reference to step 106 of FIG. 2. In one embodiment, the delta TOAs 502 may be similar to the delta TOA determined at step 106 of FIG. 2.

Furthermore, at step 504, a standard deviation of the delta TOAs corresponding to the plurality of blades may be calculated. For example, when the plurality of blades includes five blades and each of the five blades has a delta TOA as delta $TOA_1$, delta $TOA_2$, delta $TOA_3$, delta $TOA_4$, delta $TOA_5$ then, a standard deviation of the delta $TOA_1$, delta $TOA_2$, delta $TOA_3$, delta $TOA_4$ and delta $TOA_5$ may be determined at the step 504. Subsequently at step 506, a normalized delta TOA corresponding to one or more of the plurality of blades may be determined. The normalized delta TOA, for example, may be determined based upon the following equation (8):

$$\text{Norm\_}\Delta TOA_k(t)=(\Delta TOA_k(t)-\text{Mean}\Delta TOA_{1toj}(t))/\text{standard\_deviation}(t) \quad (8)$$

where Norm_$\Delta TOA_k$(t) is a normalized delta TOA corresponding to a blade k at a t instant of time, $\Delta TOA_k$(t) is a delta TOA corresponding to the blade k at the t instant of time, Mean$\Delta TOA_{1toj}$(t) is a mean of delta TOA corresponding to blades 1 to j that includes the blade k.

Moreover, at step 508, a standard deviation of the normalized delta TOA corresponding to the one or more of the plurality of blades may be determined. Subsequently at step 510, a delta sigma_3 may be determined. The delta sigma_3, for example, may be determined by determining a difference between the standard deviation of the normalized delta TOA and a previous standard deviation of normalized delta TOA. The term "previous standard deviation of normalized delta TOA" may be used to refer to a standard deviation of normalized delta TOA that is determined at a time step T−1 in comparison to a standard deviation of normalized delta TOA that is determined at a time step T.

Subsequent to the determination of the delta sigma_3 at step 510, a check may be carried out at step 512 to verify if the delta sigma_3 is greater than a predetermined second threshold and/or if the plurality of blades are operating for the first time after a start up. The predetermined second threshold may be determined empirically based upon historical delta TOA. At step 512 if it is determined that the delta sigma_3 is greater than the predetermined second threshold or the plurality of blades are operating for the first time after a start up, then the control may be transferred to step 514. At step 514, a reseating offset corresponding to each of the one or more of the plurality of blades may be determined. The determination of the reseating offset will be explained in greater detail with reference to FIG. 6. Subsequent to the determination of the reseating offset, at step 516 the reseating offset may be stored in the data repository, such as, the data repository 48 (see FIG. 1).

With returning reference to step 512, when it is determined that the delta sigma_3 is not greater than the predetermined second threshold and the plurality of blades are not operating for the first time after a start up then the control may be transferred to step 518. At step 518, a reseating offset corresponding to each of the one or more of the plurality of blades may be retrieved from the data repository. It may be noted that no reseating offset is generated when the delta sigma_3 is not greater than the predetermined second threshold and the blades are not operating for the first time after a start up. Accordingly, an existing reseating offset from the data repository is retrieved at step 518. Subsequent to the retrieval of the reseating offset, a corrected delta TOA corresponding the one or more of the plurality of blades may be determined at step 520. The corrected delta TOA, for example, may be determined utilizing the techniques explained with reference to step 330 of FIG. 3. As previously noted with reference to FIG. 3, the corrected delta TOA may be determined utilizing the techniques described with reference to step 330 of FIG. 3. For example, the corrected delta TOA corresponding to a blade may be determined utilizing the normalized delta TOA corresponding to the blade that is determined at step 506 and a reseating offset corresponding to the blade that is retrieved from the data repository at step 518. In one embodiment, a corrected delta TOA corresponding to a blade may be determined by subtracting a reseating offset corresponding to the blade from a normalized delta TOA corresponding to the blade. In another embodiment, a corrected delta TOA corresponding to a blade may be determined by subtracting a reseating offset corresponding to the blade from delta TOA corresponding to the blade. The delta TOA, for example, may be one of the delta TOA 502 corresponding to the plurality of blades.

Furthermore, at step 522, the corrected delta TOA may be filtered to generate static deflection 524. As previously noted with reference to FIG. 3, the filtering of the corrected delta TOA may reduce noise from the corrected delta TOA. The corrected delta TOA, for example, may be filtered using a median filtering technique, a moving average filtering technique, or combinations thereof.

Figure 6:
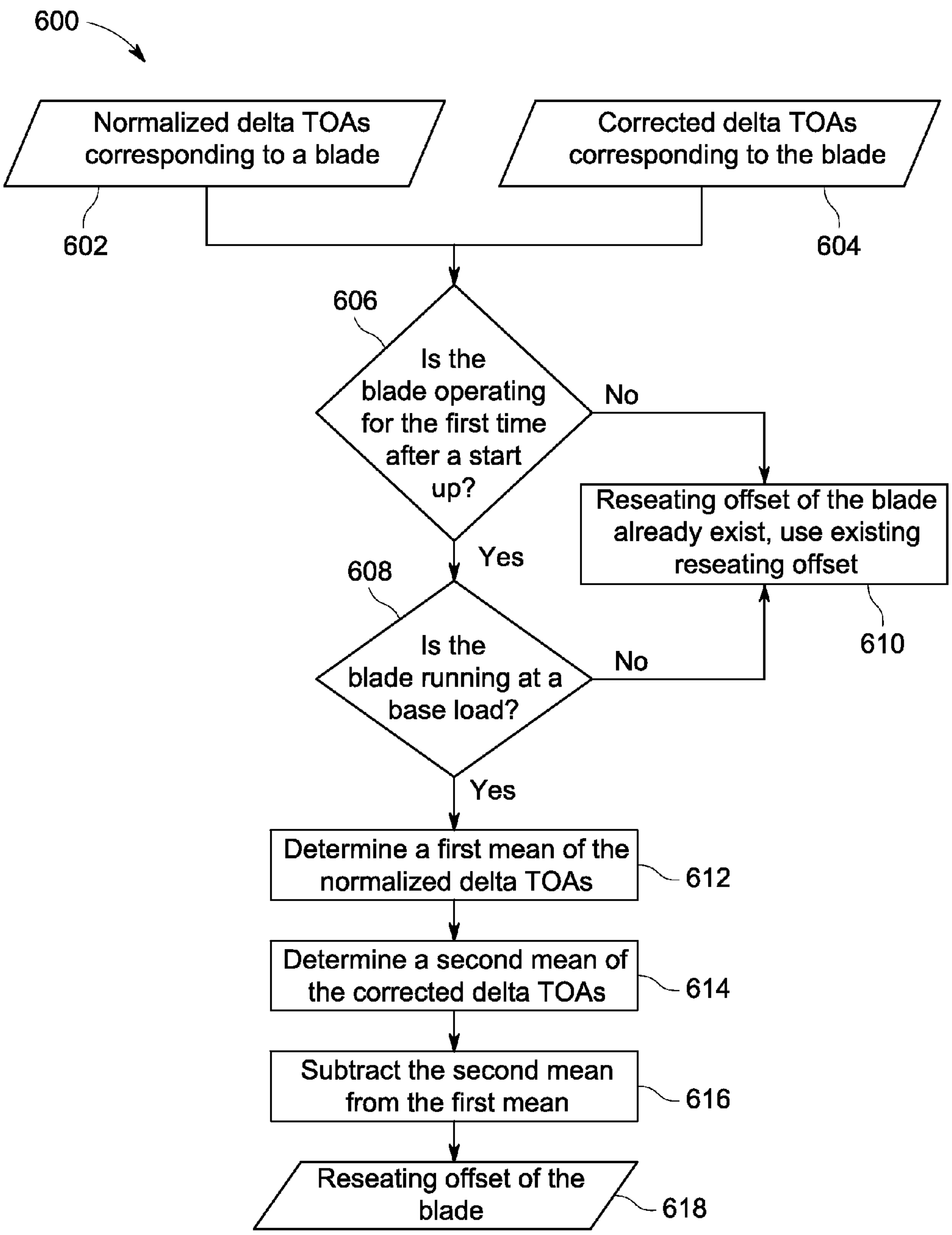
FIG. 6 is a flowchart representing steps in a method for determining a reseating offset corresponding to a blade, in accordance with an embodiment of the present techniques.

Referring now to FIG. 6, a flowchart representing steps in a method 600 for generating a reseating offset corresponding to a blade, in accordance with an embodiment of the present techniques, is depicted. More particularly, method 600 explains steps 328 of FIG. 3, 422 of FIGS. 4 and 514 of FIG. 5. As shown in FIG. 6, reference numeral 602 is representative of normalized delta times of arrival (TOAs) corresponding to the blade. In one embodiment, the normalized delta TOAs 602 may be one or more of normalized delta TOAs that have been determined using the techniques described with reference to steps 320 of FIG. 3, 414 of FIG. 4, 506 of FIG. 5. In one embodiment, the normalized delta TOAs 602 are one or more of normalized delta TOAs corresponding to the blade that has been determined after transient events of the blade. The transient events, for example, may include a start up or shutdown of a device that includes the blades, continuous change in the speed of the blades, or the like.

Furthermore, reference numeral 604 is representative of one or more corrected delta TOAs corresponding to the blade that has been determined utilizing normalized delta TOAs that were generated before the transient events. The transient events are transient events after which the normalized delta TOAs 602 were determined. At step 606, a check is carried out to determine if the blade is running for the first time after a start up. At step 606 if it is determined, that the blade is running for the first time after a start up then the control is transferred to step 608. Furthermore, at step 608, a check may be carried out to determine if the blade is running at a base load. At step 608, if it is determined that the blade is not running at a base load then the control may be transferred to step 610. With returning reference to step 606 if it is determined that the blade is not running for the first time after a start up, then control may be transferred to the step 610. At step 610 it is declared that a reseating offset corresponding to the blade already exists in a data repository, such as, the data repository 48 (see FIG. 1). Therefore, a reseating offset is not determined.

With returning reference to step 608, if it is determined that the blade is running at a base load, then the control may be transferred to step 612. At step 612, a first mean of the one or more normalized delta TOAs 602 may be determined. Furthermore, at step 614, a second mean of the one or more corrected delta TOAs 604 may be determined. Subsequent to the determination of the first mean and the second mean, a reseating offset 618 corresponding to the blade may be determined by subtracting the second mean from the first mean at step 616.

The embodiments of the present system and techniques result in real-time determination of features of one or more blades. The one or more features may be used to evaluate the health of the blades in real-time. Furthermore, the present system and techniques provides a central processing subsystem to determine the features of one or more blades in one or more devices, wherein the devices may be located at different remote locations. In addition, the present techniques deduct the effects of operational data from the TOAs to determine normalized delta TOAs. Furthermore, the present techniques normalize the effects of operational data on the TOAs of the blades to determine the normalized delta TOAs. The normalized delta TOAs may be used for determining defects or cracks in the blades. Certain embodiments of the present techniques also facilitate detection of variations in the TOAs of the blade due to reseating of the blades. In addition, the determination of the normalized delta TOAs may be used for monitoring the health of the blades. For example, the normalized delta TOAs may be used to determine whether there are one or more cracks in the blades. The present system may continuously monitor health of turbomachinary blades located in geographically dispersed locations around the world 24×7. The present system has in-built redundancy to recover quickly after a hardware crash. The present system also provides visualization tools to analyze health of blades using features extracted from TOA data.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A system, comprising a data acquisition system that generates time of arrival (TOA) data corresponding to a plurality of blades in a device;

a central processing subsystem that:

determines features of each of the plurality of blades utilizing the TOA data; and evaluates the health of each of the plurality of blades based upon the determined features, wherein the central processing subsystem determines the features of each of the plurality of blades after adjusting the TOA data based on the effects of reseating of the plurality of blades.

2. The system of claim 1, further comprising a sensor that generates blade passing signals (BPS) by sensing the arrivals of each of the plurality of blades at respective reference point.

3. The system of claim 2, wherein the data acquisition system determines the TOA data utilizing the BPS signals.

4. The system of claim 2, wherein the TOA data comprises at least one of: clearance data, an identity of the sensor; an identity of each of the plurality of blades, an identity of the device; actual times of arrival (TOAs) associated with each of the plurality of blades, and the category of the sensor indicating whether the sensor is a leading edge or a trailing edge sensor.

5. The system of claim 1, wherein the features comprise at least one of: static deflection, dynamic deflection, and variations in resonance frequencies.

6. The system of claim 1, further comprising an onsite monitoring machine (OSM) for collecting operational data of the device.

7. The system of claim 6, wherein the operational data comprises at least one of: an inlet guide vane (IGV) angle, an inlet temperature (CTIM), a load (DWATT) associated with the device, a mass flow associated with the device, and a discharge pressure of the device.

8. The system of claim 6, wherein the central processing subsystem determines the features of each of the plurality of blades after adjusting the actual times of arrival in the TOA data based on the effects associated with the operational data.

9. The system of claim 1, further comprising a web server that displays the features of the plurality of blades.

10. The system of claim 9, wherein the web server displays the features as tables, charts, other visuals, or combinations thereof.

11. The system of claim 1, wherein the central processing subsystem stores the TOA data as a back up file.

12. The system of claim 1, further comprising a data repository that stores the features of the plurality of blades.

13. A system, comprising:

a plurality of devices, wherein each of the plurality of devices comprises a plurality of blades;

a plurality of data acquisition systems that generate time of arrival (TOA) data corresponding to the plurality of blades in each of the plurality of devices;

a central processing subsystem that:

determines features of each of the plurality of blades utilizing the TOA data;

evaluates the health of each of the plurality of blades based upon the determined features to generate health evaluation results; and a web server for displaying the features and the health evaluation results of the plurality of blades.

14. The system of claim 13, wherein the health evaluation results comprise charts, plots, visuals, and graphs.

15. The system of claim 13, wherein the plurality of devices comprises one of: a turbomachine, a gas turbine, a compressor, a jet engine, a high speed ship engine, and a small scale power station.

16. The system of claim 13, wherein the plurality of devices are located at remote locations from one another.

17. A method for monitoring the health of a plurality of blades in a device, comprising:

generating time of arrival (TOA) data corresponding to each of the plurality of blades in a device;

determining features of each of the plurality of blades utilizing the TOA data after adjusting the TOA data based on the effects of reseating of the plurality of blades by a processing subsystem; and evaluating the health of each of the plurality of blades based upon the determined features by the processing subsystem.

18. The method of claim 17, wherein generating the TOA data comprises:

generating blade passing signals (BPS) corresponding to the plurality of blades by a sensor;

receiving the BPS signals from the sensor;

determining actual TOAs of the plurality of blades utilizing the BPS signals; and generating the time of arrival TOA data utilizing the BPS signals.

19. The method of claim 18, wherein determining the features of the plurality of blades comprises deducting the effects of one or more operational data from the actual TOAs of the plurality of blades.

* * * * *